United States Patent [19]

Swanson

[11] Patent Number: 5,184,559
[45] Date of Patent: Feb. 9, 1993

[54] SEED DISTRIBUTION DEVICE

[76] Inventor: Craig K. Swanson, R.R. 2, Box 140, New Richmond, Wis. 54017

[21] Appl. No.: 699,355

[22] Filed: May 13, 1991

[51] Int. Cl.⁵ .............................................. A01C 7/16
[52] U.S. Cl. ..................................... 111/11; 111/130; 111/170; 239/522; 239/650
[58] Field of Search ................... 111/130, 11, 12, 170, 111/175, 150; 239/650, 461, 500, 509, 518, 521, 522

[56] References Cited

U.S. PATENT DOCUMENTS

| 215,614 | 5/1879 | Heiges | 111/150 |
|---|---|---|---|
| 256,764 | 4/1882 | Tenant | 111/12 |
| 277,260 | 5/1883 | Free | 239/522 X |
| 335,928 | 2/1886 | Horey et al. | 111/11 |
| 2,962,194 | 11/1960 | Cotter | 239/650 X |
| 3,229,857 | 1/1966 | Kirschmann | 111/130 X |

FOREIGN PATENT DOCUMENTS

| 92979 | 7/1897 | Fed. Rep. of Germany | 111/130 |
|---|---|---|---|
| 1130213 | 12/1984 | U.S.S.R. | 111/11 |
| 1477285 | 5/1989 | U.S.S.R. | 239/522 |
| 531984 | 1/1941 | United Kingdom | 111/11 |

Primary Examiner—Dennis L. Taylor
Assistant Examiner—Jeffrey L. Thompson

[57] ABSTRACT

The present invention consists of a new distribution device for use with conventional seeding meters. The system consists of a seed meter for dispensing a predetermined amount of seed and the distributor of this invention disposed below the dispenser. The invention is of a plate having an intricate geometrical configuration positioned below the volume or weight seed distributor to insure that the seeds are contained for controlled fall toward the ground and a portion shaped to provide even distribution of the seed whether or not the seeds are distributed by the center or either side of the present seed distribution system.

6 Claims, 2 Drawing Sheets

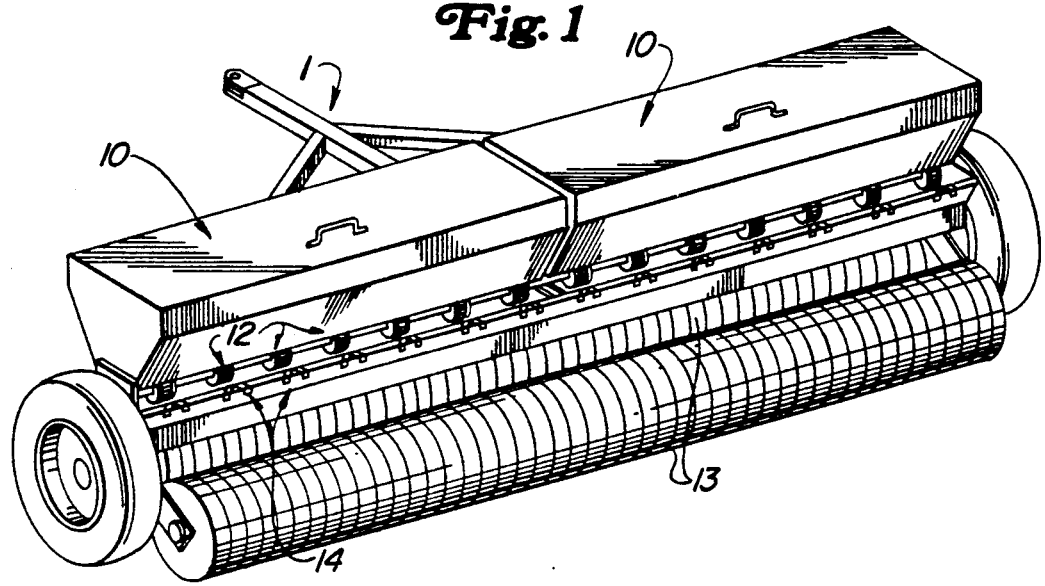
Fig. 1
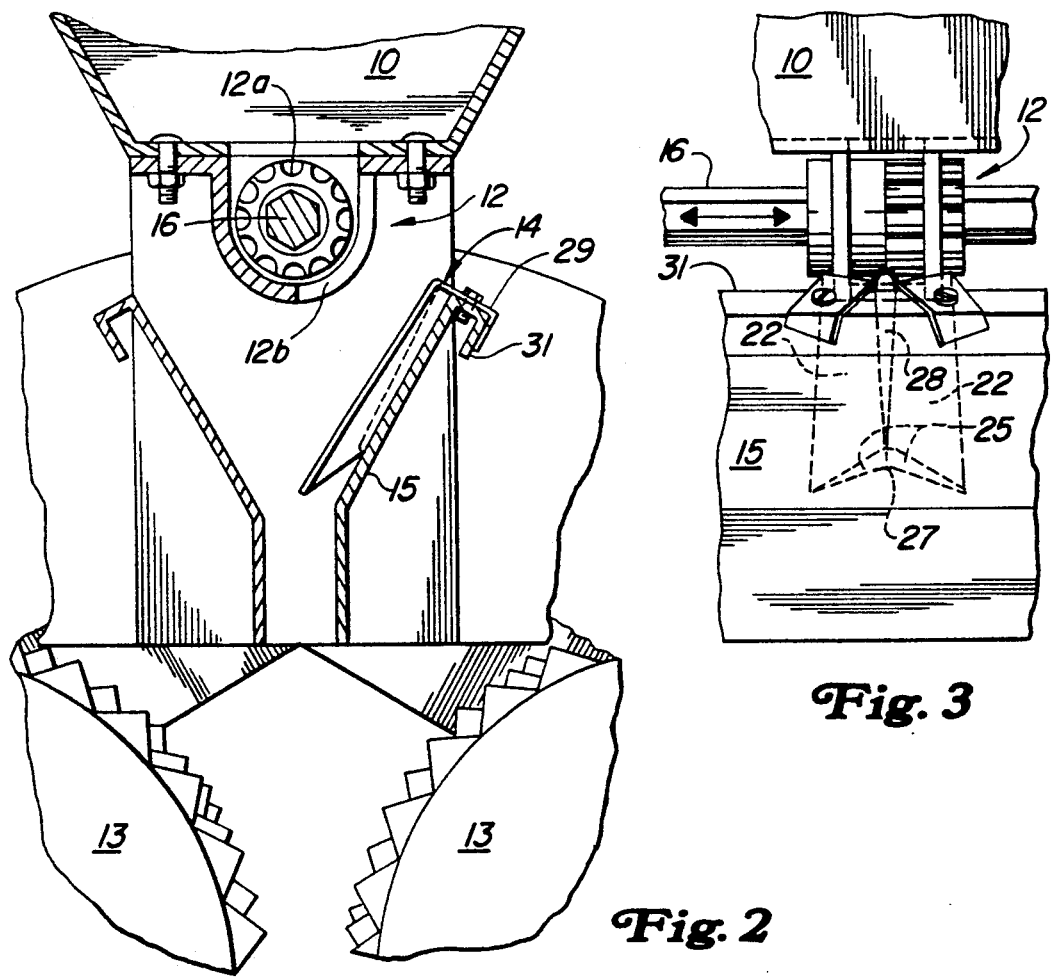
Fig. 2
Fig. 3

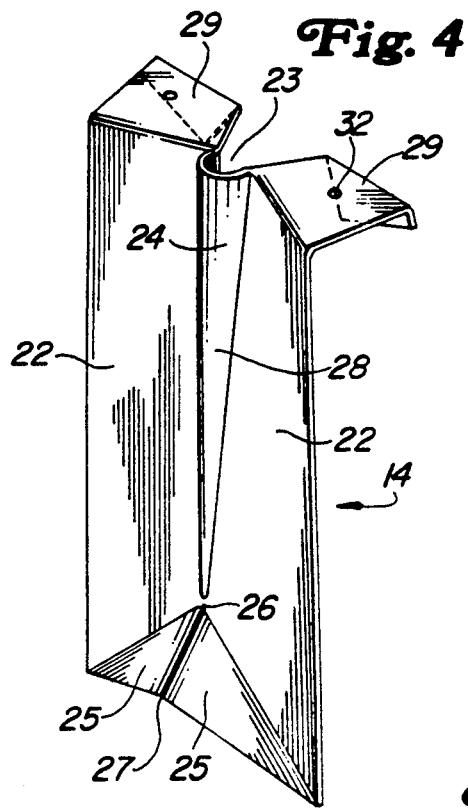
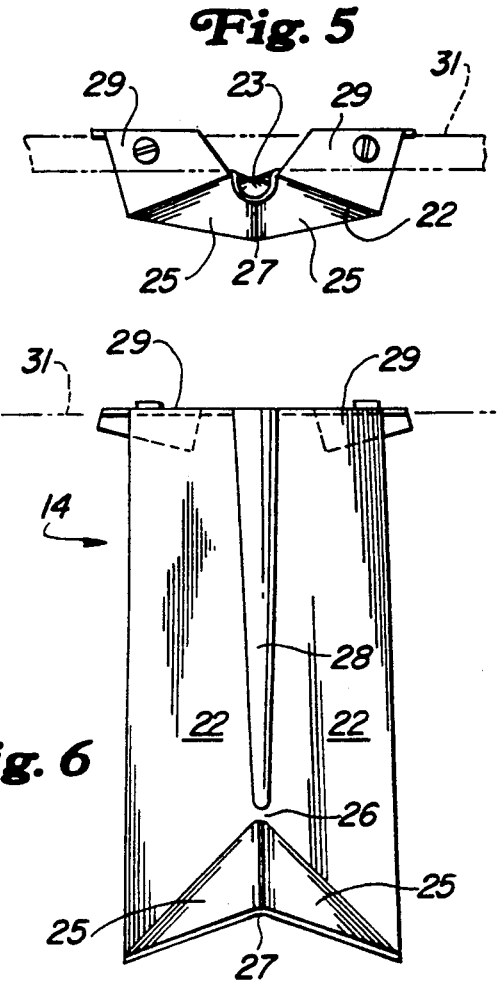
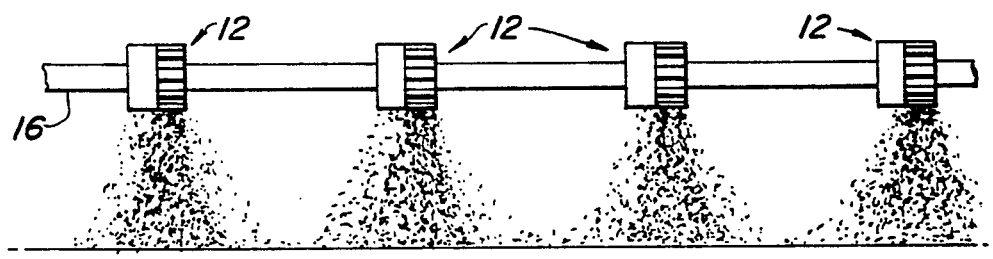
Fig. 7 (PRIOR ART)
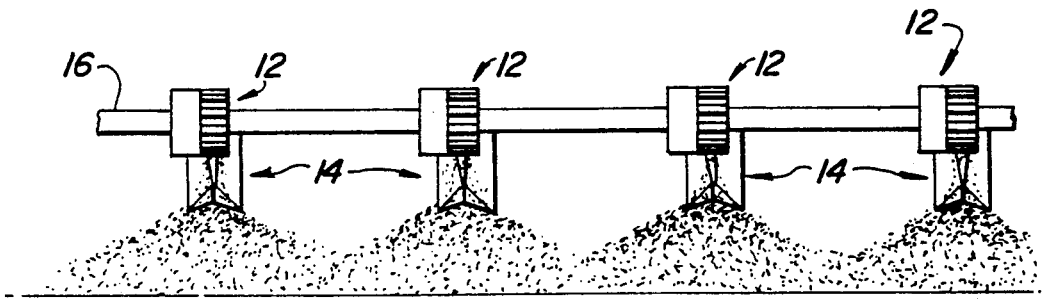
Fig. 8

5,184,559

SEED DISTRIBUTION DEVICE

BACKGROUND OF THE INVENTION

Traditionally, in the distribution of small grain seeds or alfalfa seeds, the seeds have been sown by hand, throwing them to try to get an even distribution. There have been rotary seed dispensers where the seeds are dropped onto a rotating cylinder and centrifugal force distributes them out over the surface as the seed distribution device is moved along either by a person on foot or by some mechanical transportation means. Seed dispensing devices, or seeders as they are sometimes called, progressed to where there was a large bin of grain carried by an implement. The grain was fed into seed cups to more closely monitor the volume or weight of seed being applied in any particular instance. The difficulties and disadvantages of this system are that the seeds are deposited in a row as a result of planting by this method. Though the volume or weight of seeds is accurately measured the utilization of the seeds over the ground being seeded is not maximized. Thus, in the prior art, the exact volumetric or seed weight can be dispensed substantially in rows or an unknown volume or weight of seeds for a given amount of land can be distributed more evenly by the older methods of distribution.

SUMMARY OF THE INVENTION

The present invention has been developed in order to alleviate the above-described drawbacks inherent in the conventional seeding systems for small grain and/or grasses.

It is therefore an object of the present invention to provide a new and useful seed distribution device which will ensure an even distribution on the ground of a predetermined volume or weight of seeds from a seed metering device.

According to the present invention, the metered seeds are fed in a stream onto the distributor of this invention which takes the stream of seeds and divides it so that the resultant distribution of seeds on the ground is substantially uniform over a prescribed area. Having a plurality of these seed distributors arranged with a plurality of metered seeding devices will permit an even distribution of seeds on the ground between metering devices.

DESCRIPTION OF THE DRAWINGS

FIG. 1 is a representation of a present day machine for metered seeding including the metered seeding device, the hoppers, the metered seeding devices and the means for incorporating the seed into the ground.

FIG. 2 is a side view of the machine of FIG. 1 and illustrates how applicant's invention is incorporated with the metered seeding device.

FIG. 3 is a rear view showing a means of mounting the invention with relationship to the variable volumetric metering devices.

FIG. 4 is an isometric view of applicant's invention.

FIG. 5 is an end view of applicant's invention showing it mounted on the seeding machine.

FIG. 6 is a top view of applicant's invention mounted on the seeding machine.

FIG. 7 is a pictorial representation of the distribution of the seeds without applicant's invention.

FIG. 8 is a pictorial representation of the distribution of seeds with applicant's invention incorporated in the seeding machine.

DETAILED DESCRIPTION OF A PREFERRED EMBODIMENT OF THE INVENTION

Referring now to FIG. 1 of the invention, seed bins 10 are shown for storing a large volume of seeds for distribution in the field as the seeder 1 is pulled across the field. The metered seeding devices 12 are shown with the incorporators 13 for incorporating the seed into the soil are also shown. The seed comes from the hoppers 10 through the metered seeding devices 12 which can be varied to provide any desired volume of seed. Applicant's invention is illustrated as 14 shown mounted below the metered seeding devices 12.

The end view in FIG. 2 shows the interior of the hoppers 10. The metered seeding devices 12 including the meter wheel 12A and the distribution void 12B, this being an open side to permit the seeds to fall out and down toward the ground. The seeds in free-fall are normally contained by the funnel-shaped parts 15. The seeds then fall to the ground for incorporation therein by incorporators 13. Applicant's invention 14 is shown mounted inside the funnel-shaped parts 15 immediately below the exit point of the seeds from the metering device 12. As shown in FIG. 3, there is a rod 16 which may move the metering device 12 so that more or less of the openings of the seed cups are available for emitting seeds. As the rod 16 is pulled clear to the left, the total seed meter is available for putting seeds to the ground as in cases where large volumes of seeds are required to insure an adequate crop.

Referring now to FIGS. 4, 5 and 6, which show applicant's invention in detail, the seed distribution device comprises an elongated member 14 which can be formed from metal or plastic and comprises two parallel sides 22, which sides are formed in the shape of a V or trough as shown in the drawing. The sides may go to the center point 23 with no ridge 24 between them as shown in the drawings. However, in the preferred embodiment there should be a divider 24 to insure the proper performance of this novel distributor. If the seeds are dropped from the dispenser evenly onto both sides 22, they proceed down both flat sides 22 until they reach the distribution portion 25. This distribution portion 25 insures that the seeds then are evenly diverted in a fan-shaped pattern to obtain the results shown in FIG. 8. In essence, you have a trough formed by the sides 22 leading the seeds away from the meter 12 and toward the ground. As the seeds fall, they hit the distribution planes 25 which are formed to disburse the seeds. This dispersal or distribution occurs because of the geometrical configuration of the two distributor surfaces 25. These two surfaces or planes form a half of a pyramid and normally have the apex 27 of this pyramid configuration at a higher level than the sides 22 of the trough.

The center divider 28 can be of any configuration such as a vertical plate or other vertical member, however, in the preferred embodiment, it is a tapered cone and tapered to the small end toward the distribution surfaces. The tip of the tapered cone may end at the base of the pyramid planes 25 or, as in the preferred embodiment, is short of the pyramid surfaces 25. This insures that the seeds delivered to either side or surface of the trough 22 can proceed across and be distributed evenly on both sides. If the divider is too high or too long, the seeds are unable to be distributed by the pyramid and will tend to bunch and may not be distributed.

Any known means of mounting the invention to a volume seed distributor may be utilized. However, in this invention members 29 are formed to fit over an existing member 31 in the seed metering device. Screws or bolts or other fastening devices may be inserted to holes 32 to hold the device in place.

As noted in FIG. 7, without the device seeds tend to fall basically into rows and thus, the crop is basically in rows and the ground between the rows is not utilized for the growing of seeds. Applicant's invention as shown in FIG. 8 distributes the seeds evenly so that there is an equal volume or number of seeds planted clear across the seeding device, thus permitting the seeds to have the advantage of more space in which to grow. The seed also gets more sunlight with which to grow thereby improving the yield of the field.

Variations in other aspects of the preferred embodiment will occur to those versed in the art, all without departure from the spirit and scope of the invention.

I claim:

1. A distribution device for attachment to a seeder adjacent the exit of a seeding mechanism delivering a measured quantity of small seeds, the device comprising:

a rectangular member with a length greater than a width;

means for fastening said member to the seeder such that the member is positioned adjacent the seeding mechanism for receiving seeds therefrom;

said member having a first portion inclined downwardly from said fastening means, said first portion formed by bending the rectangular member to form outwardly angled sides of a trough for containing seeds as they exit the seeding mechanism; and a second portion of said rectangular member downstream of the flow of seeds in said first portion formed as a truncated pyramid with truncated sides of the pyramid coextensive with and forming a bend-line with the lowermost ends of the outwardly angled sides of the trough, and the apex of the pyramid aligned with the center of the trough.

2. A device as claimed in claim 1 wherein said trough in said first portion has a raised rib portion on the center line of said trough.

3. A device as claimed in claim 2 wherein said rib portion is tapered downstream in said trough.

4. A device as claimed in claim 3 wherein said rib portion is convex in contour and is shaped as a longitudinally truncated cone.

5. A device as claimed in claim 4 wherein the apex of the pyramid of said second portion is higher than the lowermost ends of the sides of the trough.

6. A device as defined in claim 1 wherein said means for fastening said member to the sender is integral with said first portion.

* * * * *